United States Patent
Grant et al.

(10) Patent No.: US 9,398,543 B2
(45) Date of Patent: Jul. 19, 2016

(54) RADIO NETWORK CONTROLLER, A SERVING BASE STATION, A USER EQUIPMENT AND METHODS THEREIN

(71) Applicant: Telefonaktiebolaget L M Ericsson (publ), Stockholm (SE)

(72) Inventors: Stephen Grant, Pleasanton, CA (US); Erik Dahlman, Bromma (SE); Andreas Höglund, Stockholm (SE); Stefan Parkvall, Stockholm (SE); Edgar Ramos, Espoo (FI); Yi-Pin Eric Wang, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 357 days.

(21) Appl. No.: 13/881,184

(22) PCT Filed: Dec. 17, 2012

(86) PCT No.: PCT/SE2012/051413
§ 371 (c)(1),
(2) Date: Apr. 24, 2013

(87) PCT Pub. No.: WO2013/133746
PCT Pub. Date: Sep. 12, 2013

(65) Prior Publication Data
US 2014/0064186 A1 Mar. 6, 2014

Related U.S. Application Data

(60) Provisional application No. 61/607,124, filed on Mar. 6, 2012.

(51) Int. Cl.
| | |
|---|---|
| H04W 4/00 | (2009.01) |
| H04W 52/26 | (2009.01) |
| H04W 52/32 | (2009.01) |
| H04W 52/14 | (2009.01) |
| H04W 52/16 | (2009.01) |
| H04W 52/24 | (2009.01) |
| H04W 52/40 | (2009.01) |
| H04W 52/38 | (2009.01) |

(52) U.S. Cl.
CPC .......... *H04W 52/265* (2013.01); *H04W 52/325* (2013.01); *H04W 52/146* (2013.01); *H04W 52/16* (2013.01); *H04W 52/242* (2013.01); *H04W 52/386* (2013.01); *H04W 52/40* (2013.01)

(58) Field of Classification Search
CPC ....................................................... H04W 52/26
USPC ........................................................... 370/328
See application file for complete search history.

(56) References Cited

U.S. PATENT DOCUMENTS

| | | | |
|---|---|---|---|
| 6,175,734 B1 * | 1/2001 | Desgagne ............. | H04W 16/18 455/424 |
| 2007/0010253 A1 | 1/2007 | Gunnarsson et al. | |
| 2009/0225895 A1 * | 9/2009 | Sheu ................... | H04L 27/2614 375/295 |

FOREIGN PATENT DOCUMENTS

| | | |
|---|---|---|
| GB | 2433383 A | 6/2007 |
| WO | 03077584 A1 | 9/2003 |

(Continued)

OTHER PUBLICATIONS

Qualcomm Incorporated "Heterogeneous Networks (HetNets) in HSPA," XP055212266, Feb. 1, 2012, pp. 1-11.

(Continued)

*Primary Examiner* — Shripal Khajuria
(74) *Attorney, Agent, or Firm* — Patent Portfolio Builders, PLLC

(57) ABSTRACT

A radio network controller, RNC, 614, and a method therein, for enhancing reception quality of transmissions on an uplink control channel from a user equipment, UE, 613 to a serving base station, BS, 610. The RNC, the UE and the serving BS are comprised in a communication system 600. The method comprises, when conditions for boosting the uplink control channel are fulfilled, determining a boosting factor based on a ratio of path gains of a channel from the UE to the serving BS and of a channel from the UE to a non-serving BS 611, respectively, which non-serving BS is comprised in the communications system. The method further comprises transmitting the determined boosting factor to the UE, whereby the reception quality of transmission on the uplink control channel from the UE to the serving BS is enhanced by the UE boosting the control channel by means of the boosting factor.

15 Claims, 9 Drawing Sheets

(56) References Cited

FOREIGN PATENT DOCUMENTS

| | | |
|---|---|---|
| WO | 2004002008 A1 | 12/2003 |
| WO | 2009072945 A1 | 6/2009 |
| WO | 2012050506 A1 | 4/2012 |

OTHER PUBLICATIONS

Sun, H. et al. "Introducing Heterogeneous Networks in HSPA," 2012 IEEE International Conference on communications (ICC), XP055212043, 2011, pp. 1-7.

* cited by examiner

RADIO NETWORK CONTROLLER, A SERVING BASE STATION, A USER EQUIPMENT AND METHODS THEREIN

TECHNICAL FIELD

Embodiments herein relate to a radio network controller, a serving base station, a user equipment, and to methods therein. In particular, embodiments herein relate to the enhancement of reception quality of transmissions on an uplink control channel from the user equipment to the serving base station.

BACKGROUND

Communication devices such as User Equipments (UE) are enabled to communicate wirelessly in a radio communications system, sometimes also referred to as a radio communications network, a mobile communication system, a wireless communications network, a wireless communication system, a cellular radio system or a cellular system. The communication may be performed e.g. between two user equipments, between a user equipment and a regular telephone and/or between a user equipment and a server via a Radio Access Network (RAN) and possibly one or more core networks, comprised within the wireless communications network.

User equipments are also known as e.g. mobile terminals, wireless terminals and/or mobile stations, mobile telephones, cellular telephones, or laptops with wireless capability, just to mention some examples. The user equipments in the present context may be, for example, portable, pocket-storable, hand-held, computer-comprised, or vehicle-mounted mobile devices, enabled to communicate voice and/or data, via the RAN, with another entity.

The wireless communications network covers a geographical area which is divided into cell areas, wherein each cell area being served by a network node such as a base station, e.g. a Radio Base Station (RBS), which sometimes may be referred to as e.g. eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several radio access and communication technologies. The base stations communicate over the radio interface operating on radio frequencies with the user equipments within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: GroupeSpécial Mobile).

In the context of this disclosure, the expression Downlink (DL) is used for the transmission path from the base station to the user equipment. The expression Uplink (UL) is used for the transmission path in the opposite direction i.e. from the user equipment to the base station.

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

According to 3GPP/GERAN, a user equipment has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

The ever increasing demand for higher data rates poses challenges to operators in how to evolve their existing cellular communications networks to meet the demand. A number of deployment options exist such as (1) increase the density of an existing macro base station grid, i.e. an existing grid of macro base stations, (2) increase the co-operation between existing macro base stations to mitigate interference, or (3) to deploy smaller and/or lower power base stations within the macro base station grid in specific areas where high data rates are needed. Such smaller and/or lower power base stations are often referred to as Low Power Nodes (LPNs) or pico base stations.

The first option (1) is complicated by the difficulty and cost associated with securing new macro sites, especially in urban areas. The second option (2) is complicated by the difficulty in securing a low latency link e.g. a fast link, between base stations to enable co-operation. In contrast, the third option (3), referred to as a heterogeneous deployment, or a heterogeneous network (HetNet), is appealing since it is often easier and more cost efficient to deploy small LPNs than to deploy macro nodes such as macro base stations.

FIG. 1 illustrates an example HetNet comprising a number of macro cells 10a and a number of pico cells 11a. The macro cell 10a defines a radio coverage area of a macro base station 10, and the pico cell 11a defines a radio coverage area of a pico cell 11. A layer or area comprising smaller base stations, or low power nodes (LPNs) is referred to as a pico layer or a pico area. The pico base stations are often placed strategically in areas with a high density of users requesting high data rates. Such areas are often referred to as hotspots.

In LTE systems, cell selection is based on the received power of the reference symbols transmitted in the downlink, e.g. Reference Symbol Received Power (RSRP) and measured by the User Equipment (UE). Due to the inherently low transmit power of the pico base stations, the pico cells 11a typically have a smaller coverage area than the macro cells 10a. For example, with a 40 W macro base station 10 and a 1 W pico base station 11, as schematically illustrated in FIG. 2, the power imbalance between them is 16 dB which produces vastly different coverage areas. This creates challenges in the deployment of the low power nodes, since unless they are deployed to exactly cover the hotspots, they will not be able to serve so many users.

Another issue with the power imbalance, e.g. the power difference, is that while users may connect to the base station with the best downlink, they may not always connect to the base station with the best uplink. Such an uplink/downlink imbalance, i.e. an imbalance between the uplink and the downlink, is illustrated in FIG. 2. The dashed bold line 12 represents the cell border from a downlink perspective, based on measured RSRP values at a user equipment 13. In other words, the dashed bold line 12 schematically illustrates the cell edge when cell selection is based on downlink received signal strength. Notice that the downlink cell border is closer to the pico base station, pico eNB, 11 due to its lower transmit border. In contrast, from an uplink perspective, the cell border should occur at a position where the path loss to both the macro base station 10 and the pico base station 11 is the same. For the sake of illustration, this occurs roughly half way between the macro and pico base stations 10,11, as is illustrated by the dotted vertical line in FIG. 2. In other words, the dotted vertical line in FIG. 2 schematically illustrates the cell edge when cell selection is based on uplink path loss. The transition zone between these two borders is the area in which a UE 13 under normal circumstances would have the best downlink from the macro eNB 10, but not the best uplink. The best uplink is to the pico eNB 11 since the path loss is less to the pico eNB 11 than to the macro eNB 10.

In certain circumstances, which will be elaborated below, it may be beneficial to bias the cell selection towards the pico base station 11 when the UE 13 is in the transition zone. To enable such offloading of UEs from the macro base station 10 to the pico base station 11, a Cell Selection Offset (CSO) may be configured. For example, say the UE 13 measures an RSRP from the pico base station 11 to be x dB and to the macro base station 10 to be y dB, with x<y. Under normal circumstances, the UE 13 would connect to the macro base station 10. However, the UE 13 may be forced to connect to the pico base station 11 if the CSO is added to x to make the adjusted RSRP from the pico base station 11 greater than the RSRP from the macro base station 10. Such a process is referred to as range expansion, since the range of the pico cell 11a is increased. If the offset is less than or equal to the macro/pico power imbalance, i.e. the power imbalance between the macro cell 10a and the pico cell 11a, then the uplink is improved since the path loss to the pico base station 11 is less than the path loss to the macro base station 10.

The trade-off is that the downlink may be penalized. However, it may still be beneficial to allow range expansion in certain circumstances. One circumstance is when the macro cell 10a is heavily loaded and the pico cell 11a is nearly empty. In that case, the UE 13 may still obtain reasonable data rates in the downlink since there are more radio resources available from the pico base station 11. Another motivation might be when the pico base station 11 is not placed exactly in the middle of a hotspot, so the use of range expansion may better ensure uptake of traffic. Yet another reason is when resource partitioning is employed in which the macro base station, e.g. macro eNB, 10 is silent or almost silent in a certain set of subframes such that interference to the DL transmissions from the pico base station 11 is avoided. Such an approach has been introduced in LTE Rel-10, and is referred to as Almost Blank Subframes (ABS).

The above discussion has focused on LTE. However, range expansion may also be configured in HSPA networks, but there it is referred to as extended Soft HandOver (SHO). One of the main differences between LTE and HSPA is that macro diversity or SHO is employed in the uplink. In other words, the UL transmissions from a UE are received, detected, and decoded by two or more base stations. The collection of links participating in SHO is referred to the active set. The process of establishing a new SHO link is further referred to as an active set update.

The implication of SHO in a HetNet scenario, is that if a UE 13 is served by the macro base station 10 in the downlink, a SHO link may be established to the pico base station 11 in the uplink without necessarily changing the serving cell away from the macro base station 10. Moreover a similar offset to the CSO discussed above may be configured such that links to a pico base station 11 are added sooner than under normal circumstances to take advantage of the better path loss to the pico base station 11 on the SHO link. By establishing such a SHO link to the pico base station 11, the uplink is helped, but the downlink is largely un-penalized in contrast to LTE. Note that the downlink is not completely un-penalized. One issue is that certain downlink control channels associated with the SHO link to the pico base station 11, such as Fractional Dedicated Physical Channel (F-DPCH), E-DCH Relative Grant Channel (E-RGCH), and E-DCH Hybrid ARQ Indicator Channel (E-HICH), may still be affected by interference from the macro base station. This sets an upper limit on the degree of SHO extension possible. This issue is not further discussed herein.

FIG. 3 illustrates the uplink and downlink cell borders in a similar fashion as in FIG. 2, except here circles indicate the area in which a UE 13 is likely to be in soft handover between both the macro base station 10 and the pico base station 11. In FIG. 3, the macro base station 10 steers power control of the UE transmitting HS-DPCCH, and the HS-DPCCH is received at serving macro base station 10 with sufficient quality. Further, in FIG. 3, the SHO region is schematically illustrated as the region between the innermost circle and the circle that falls between the equal pathloss border and the equal received CPICH border, Thus, this occurs in a fairly narrow strep around the downlink cell border where the receive power of the common pilot, e.g. Common Pilot Channel (CPICH), from both the pico and macro NodeBs 10,11 is equal. The conventional SHO region is fairly narrow, and is defined by a set of thresholds that determine when SHO links are added to the active set.

FIG. 4 shows the case when an offset is added to the threshold to allow soft handover links to be established to the pico base station 11 sooner than in a conventional situation. In FIG. 4, the pico base station 11 steers power control of UE transmitting HS-DPCCH, and the HS-DPCCH is received at serving macro base station 10 with insufficient quality, thus requiring boosting. In this case, no offset is employed for adding SHO links to macro base stations 10. The effect is to extend the SHO region outwards from the pico base station 11. As discussed earlier, and emphasized here again, the UE 13 in the extended SHO region is still served by the macro base station 10 in the downlink since it is to the left of the DL cell border.

SUMMARY

An object of embodiments herein is to provide a way of improving the performance in a communications network.

According to a first aspect of embodiments herein, the object is achieved by a method in a radio network controller for enhancing reception quality of transmissions on an uplink control channel from a user equipment to a serving base station. The radio network controller, the user equipment and the serving base station are comprised in a communication system.

When conditions for boosting the uplink control channel are fulfilled, the radio network controller determines a boosting factor based on a ratio of path gains of a channel from the user equipment to the serving base station and of a channel from the user equipment to a non-serving base station, respectively. The non-serving base station is comprised in the communications system. Further, the radio network controller transmits the determined boosting factor to the user equipment, whereby the reception quality of transmission on the uplink control channel from the user equipment to the serving base station is enhanced by the user equipment boosting the uplink control channel by means of the boosting factor.

According to a second aspect of embodiments herein, the object is achieved by a radio network controller for enhancing reception quality of transmissions on an uplink control channel from a user equipment to a serving base station. The radio network controller, the user equipment and the serving base station are comprised in a communication system.

The radio network controller comprises a determining circuit configured to, when conditions for boosting the uplink control channel are fulfilled, determine a boosting factor based on a ratio of path gains of a channel from the user equipment to the serving base station and of a channel from the user equipment to a non-serving base station, respectively. Further, the radio network controller comprises a transmitting circuit configured to transmit the determined boosting factor to the user equipment, whereby the reception quality of transmission on the uplink control channel from the user equipment to the serving base station is enhanced by the user equipment boosting the uplink control channel by means of the boosting factor.

According to a third aspect of embodiments herein, the object is achieved by a method in a serving base station for enhancing reception quality of transmissions on an uplink control channel from a user equipment to the serving base station. The serving base station and the user equipment are comprised in a communication system.

When conditions for boosting the uplink control channel are fulfilled, the serving base station transmits an extra Transmit Power Control, TPC, command to the user equipment for controlling a boosting factor used by the user equipment, whereby the reception quality of transmission on the uplink control channel from the user equipment to the serving base station is enhanced by the user equipment boosting the uplink control channel by means of the boosting factor.

According to a fourth aspect of embodiments herein, the object is achieved by a serving base station for enhancing reception quality of transmissions on an uplink control channel from the user equipment to the serving base station. The serving base station and the user equipment are comprised in a communication system.

The serving base station comprises a transmitting circuit configured to, when conditions for boosting the uplink control channel are fulfilled, transmit an extra Transmit Power Control, TPC, command to the user equipment for controlling a boosting factor used by the user equipment, whereby the reception quality of transmission on the uplink control channel from the user equipment to the serving base station is enhanced by the user equipment boosting the uplink control channel by means of the boosting factor.

According to a fifth aspect of embodiments herein, the object is achieved by a method in a user equipment for enhancing reception quality of transmissions on an uplink control channel from the user equipment to a serving base station. The user equipment, the serving base station, and a non-serving base station are comprised in a communication system.

When conditions for boosting the uplink control channel are fulfilled, the user equipment determines a boosting factor based on a ratio of path gains from the user equipment to the serving base station and from the user equipment to the non-serving base station respectively. Further, the user equipment boosts the transmit power level of the uplink control channel with the determined boosting factor, whereby the reception quality of transmission on the uplink control channel from the user equipment to the serving base station is enhanced.

According to a sixth aspect of embodiments herein, the object is achieved by a user equipment for enhancing reception quality of transmissions on an uplink control channel from the user equipment to a serving base station. The user equipment, the serving base station, and a non-serving base station are comprised in a communication system.

The user equipment comprises a determining circuit configured to, when conditions for boosting the uplink control channel are fulfilled, determine a boosting factor based on a ratio of path gains from the user equipment to the serving base station and from the user equipment to the non-serving base station, respectively. Further, the user equipment comprises a boosting circuit configured to boost the transmit power level of the uplink control channel with the determined boosting factor, whereby the reception quality of transmission on the uplink control channel from the user equipment to the serving base station is enhanced.

Since the transmit power level of the uplink control channel is boosted when conditions for boosting the uplink control channel are fulfilled, the reception quality of transmission on the uplink control channel from the user equipment to the serving base station is enhanced. This results in an improved performance in the communications network.

An advantage of embodiments herein is that extended SHO may be configured without sacrificing uplink control channel quality. With this robustness, the general benefits of HetNets may be realized in terms of improved uplink data rates, enhanced system capacity, offloading of macro base stations, load balancing, etc.

BRIEF DESCRIPTION OF THE DRAWINGS

Examples of embodiments herein are described in more detail with reference to attached drawings in which.

DETAILED DESCRIPTION

Embodiments herein will be exemplified in the following non-limiting description.

As part of developing embodiments herein, a problem will first be identified and discussed.

A significant issue with the use of extended SHO in a HSPA HetNet scenario, is that the reception quality of one of the key uplink control channels, namely the HS-DPCCH, may become compromised. This channel carries for example ACK/NACKs of the transmitted downlink (DL) data, Channel Quality Information (CQI) reports, precoding recommendations, etc.

Figure 1:
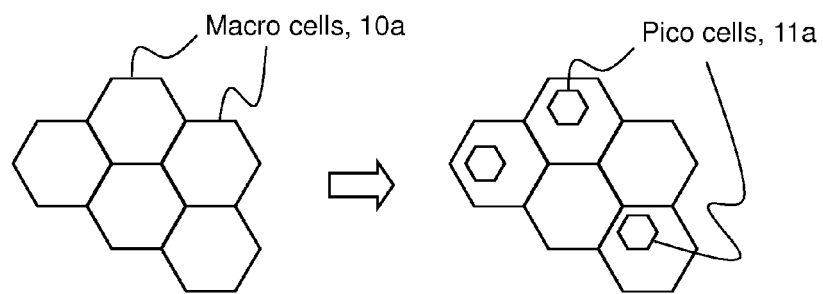
FIG. 1 schematically illustrates heterogeneous deployment of macro cells and pico cells.
Figure 2:
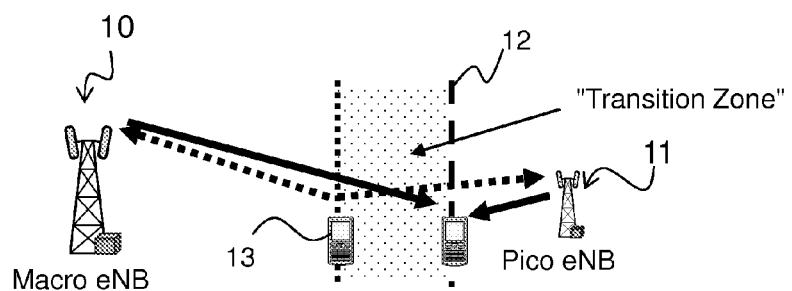
FIG. 2 schematically illustrates the uplink and downlink power imbalance in a HetNet and its effect on cell borders.
Figure 3:
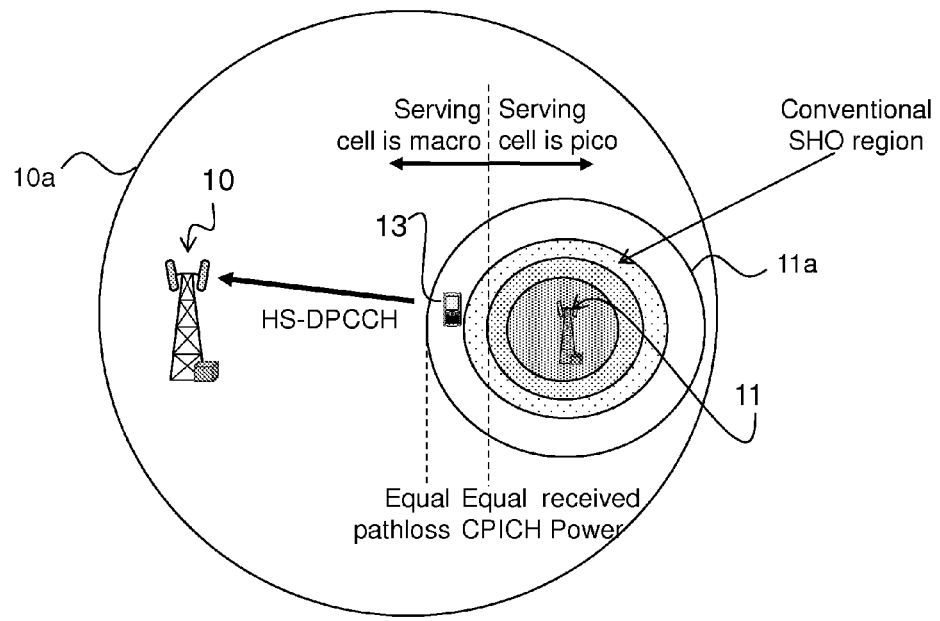
FIG. 3 schematically illustrates a conventional soft handover (SHO) region.
Figure 4:
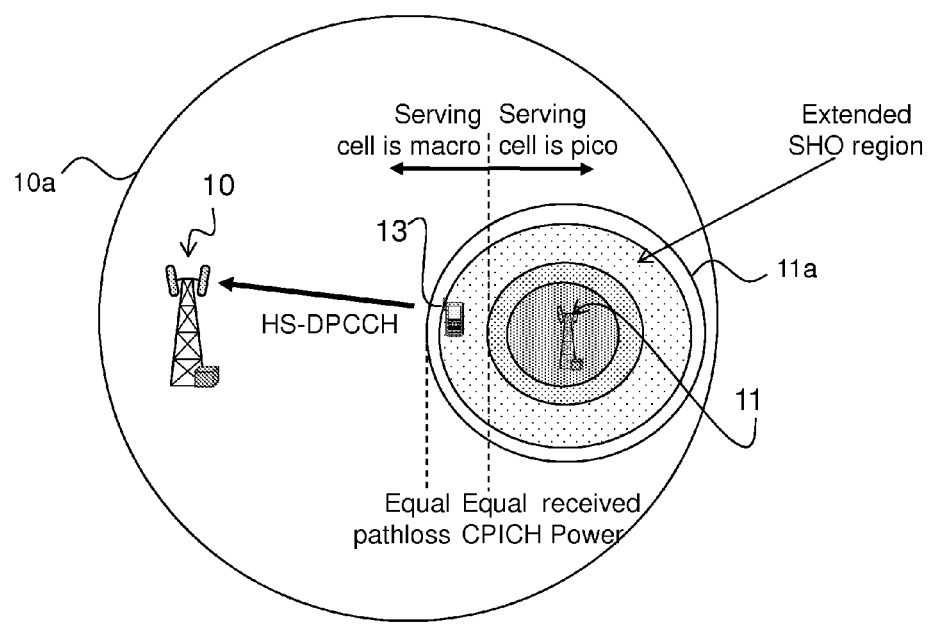
FIG. 4 schematically illustrates an extended soft handover (SHO) region.

The reason for the compromised quality is as follows. For UEs 13 in the extended SHO region, cf. FIG. 4, the link in the active set corresponding to the smallest path loss effectively "steers" the power control. Referring to FIG. 4, the pico base station 11 steers the power control since the path loss to the pico base station 11 is better than the path loss to the macro base station 10, i.e. since the path loss to the pico base station 11 is less than the path loss to the macro base station 10. This is the case since the UE 13 is to the right of the UL cell border of the pico base station 11.

By "steering" it is meant that both the macro base station 10 and the pico base station 11 issue Transmit Power Control (TPC) commands to the UE 13 based on the measured quality of the DPCCH uplink control channel. If the quality is above a certain target, e.g. a certain threshold, the base station 10,11 issues a power down command. Conversely, if the measured quality of the DPCCH uplink control channel is less than the target, the base station 10,11 issues a power up command. The UE 13 responds by performing a logical "OR" operation between the two received TPC commands. Hence, as long as one of the TPC commands is "down" the UE 13 will lower its transmit power. If the target quality is the same at both the macro base station 10 and the pico base station 11, then the resulting transmit power will end up being set at such a level to overcome the path loss to the "best" base station 10,11, i.e., the "best" base station 10,11 is the one with the lowest path loss.

With the transmit power set high enough to "reach" the pico base station 11, the received power level of the uplink control channel, e.g. the HS-DPCCH, at the macro base station 10 may be insufficient to ensure good detection and/or decoding performance. This is a problem since the macro base station 10 is the intended recipient of the control information carried by the uplink control channel, e.g. the HS-DPCCH, since the macro base station 10 is still the serving base station.

Therefore, an object of various embodiments described herein is to provide uplink control channel boosting, i.e. to increase the transmitted power level of the uplink control channel e.g. the HS-DPCCH, when three conditions are fulfilled: 1) The active set includes a link to both a macro base station and to a pico base station, 2) The macro base station is the serving base station, and 3) Extended SHO is configured.

In today's HSPA systems, the power level of the uplink control channel, e.g. the HS-DPCCH, is set according to the so-called beta factor $\beta_{hs}$ which is defined as a power offset or a power ratio compared to the DPCCH control channel. The larger beta factor $\beta_{hs}$, the more power is allocated to the HS-DPCCH. The beta factor to be used for the HS-DPCCH is typically indicated to the UE 13 through RRC signaling from the RNC 14 to the UE 13. The beta factor $\beta_{hs}$ setting is included in a table of E-DCH (uplink data) transport formats. Such a transport format table may be configured at the UE 13 by the RNC 14 through RRC signaling at call set up.

As previously described, for a UE 13 in the extended SHO region, the power control is steered primarily by the non-serving base station 11; i.e. the pico base station, to which the path gain, i.e. the inverse of path loss, is greater than to the serving base station 10, i.e. the macro base station. The path gains from the UE 13 to the pico base station and to the macro base station are denoted, respectively, as $G_{pico}$ and $G_{macro}$. The ratio of the two path gains values is given by $$\frac{G_{pico}}{G_{macro}} = \frac{P_{meas,pico}}{P_{meas,macro}} \cdot \frac{P_{TX,macro}}{P_{TX,pico}} \quad (1)$$

Figure 5:
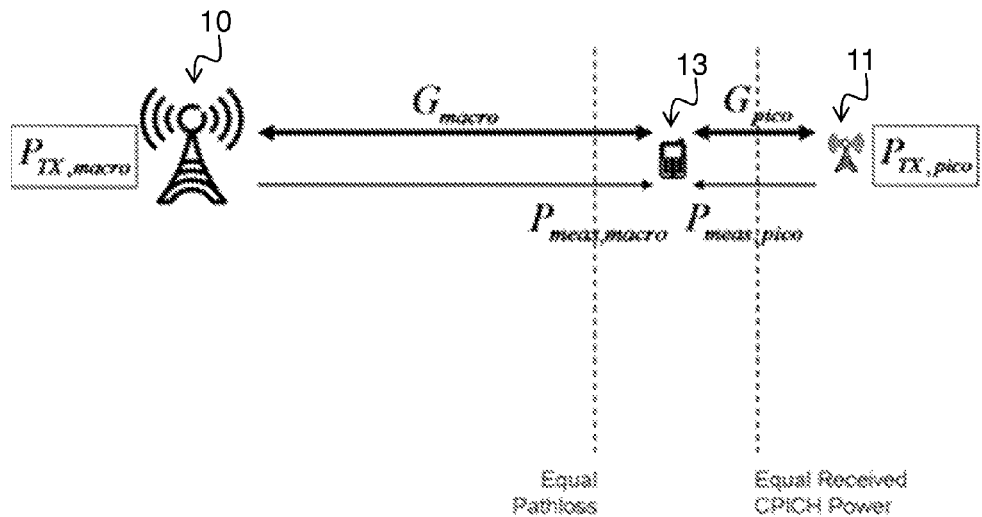
FIG. 5 schematically illustrates path gains, measured CPICH powers for an UE in an extended SHO region.

Here $P_{meas,pico}$ and $P_{meas,macro}$ and are the received CPICH power levels from the pico base station and macro base station, respectively, measured at the UE 13. $P_{TX,pico}$ and $P_{TX,macro}$ are the CPICH transmit power levels of the pico base station and the macro base station, respectively. When both the macro and pico base stations use the same power allocation factor for CPICH, $P_{TX,pico}$ and $P_{TX,macro}$ in (1) may also represent the total base station transmit power levels. These quantities are shown diagrammatically in FIG. 5.

As the UE 13 moves around in the extended SHO region, the path gain ratio changes. For example, at the equal path loss border, i.e. when $G_{pico}=G_{macro}$, the path gain ratio is unity. Conversely, at the equal received CPICH power border, i.e. when $P_{TX,pico}=P_{TX,macro}$, the path gain ratio achieves a maximum value given by $$\frac{G_{pico}}{G_{macro}} = \frac{P_{TX,macro}}{P_{TX,pico}} \quad (2)$$

This is equal to the macro/pico power imbalance, e.g., 9 dB for the case of a 40 W macro base station and a 5 W pico base station.

Thus, a concept of various embodiments described herein is to increase the transmitted power level of an uplink control channel, such as the High Speed Dedicated Physical Control Channel (HS-DPCCH), when three conditions are fulfilled: 1) The active set includes a link to both a macro base station and to a pico base station, 2) The macro base station is the serving base station, and 3) Extended SHO is configured.

The procedure of increasing the transmitted power level of the uplink control channel is referred to as boosting of the control channel, boosting of the uplink control channel, control channel boosting, uplink control channel boosting, or HS-DPCCH boosting.

As previously mentioned, the collection of links between a user equipment and one or more macro base stations and/or one or more pico base stations, and which collection of links participates in the SHO is referred to as the active set.

Three different types of embodiments, described below, cover different methods of how to configure HS-DPCCH boosting, and which Node in the system is in control. The node in control may be a Radio Network Controller (RNC), a Radio Base Station (RBS), or a User Equipment (UE).

In the various embodiments, either a fixed boosting factor or a variable boosting factor may be used. In either case, the boosting factor is determined based on a ratio of path gains to the pico base station and the macro base station, respectively. In this way, the boosting factor overcomes the fact that the HS-DPCCH is power controlled according to the path gain to the non-serving base station, i.e. to the pico base station. The path gain ratio is computed based on the transmit powers of the macro and pico base stations as well as based on the received Common Pilot Channel (CPICH) strengths measured by the UE and reported to the RNC.

Advantages of various embodiments are for example that extended SHO may be configured without sacrificing uplink control channel quality. With this robustness, the general benefits of HetNets may be realized in terms of improved uplink data rates, enhanced system capacity, offloading of macro base stations, load balancing, etc.

Figure 6:
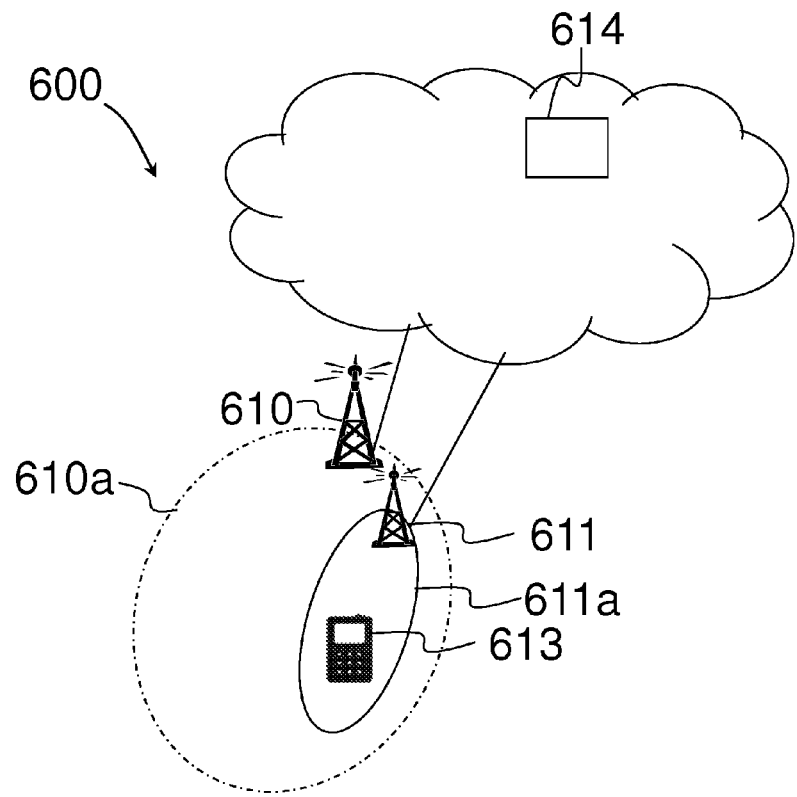
FIG. 6 is a schematic block diagram illustrating embodiments of an exemplary communication system.

FIG. 6 schematically illustrates embodiments of a radio communications system 600. The radio communication system 600 may be a 3GPP communications system or a non-3GPP communications system. The radio communications system 600 may comprises one or more of radio communications networks. Each radio communications network may be configured to support one or more Radio Access Technologies (RATs). Further, the one or more radio communications networks may be configured to support different RATs. Some examples of RATs are GSM, UMTS, WCDMA, and LTE.

The radio communications system 600 comprises a radio base station 610, 611. The radio base station 610,611 may be a base station such as an eNB, an eNodeB, Node B or a Home Node B, a Home eNode B, a relay node which may be fixed or movable, a donor node serving a relay, a GSM/EDGE radio base station, a Multi-Standard Radio (MSR) base station or any other network unit capable to serve a user equipment or another radio base station comprised in the cellular communications system 600.

As previously mentioned, the base station may be a macro base station or a pico base station. Further, the base station may be considered as a serving base station or as a non-serving base station.

Further, the radio base station 610,611 provides radio coverage over at least one geographical area 610a, 611a, which herein sometime is referred to as a cell 610a,611a.

The radio communications system 600 comprises further a user equipment 613. The user equipment 613 is located within the cell 610a,611a and is served by the radio base station 610,611. Further, the user equipment 613 transmits data over a radio interface to the radio base station 610,611 in an uplink (UL) transmission and the radio base station 610, 611 transmits data to the user equipment 613 in a downlink (DL) transmission.

The user equipment 613 may be e.g. a mobile terminal, a wireless terminal, a wireless device, a mobile phone, a computer such as e.g. a laptop, a tablet pc such as e.g. an iPad™, a Personal Digital Assistant (PDA), or any other radio network unit capable to communicate over a radio link in a cellular communications network. The user equipment 613 may further be configured for use in both a 3GPP network and in a non-3GPP network.

The radio communications system 600 comprises further a Radio Network Controller (RNC) 614. The Radio Network Controller 614 may be a governing element as it is in the UMTS Radio Access Network (UTRAN), wherein it is responsible for controlling the radio base stations that are connected to it. The Radio Network Controller 614 carries out radio resource management, some of the mobility management functions and is the point where encryption is done before user data is sent to and from the user equipment. The Radio Network Controller 614 may connect to a Circuit Switched Core Network through a Media Gateway (MGW) and to a Serving GPRS Support Node (SGSN) in a Packet Switched Core Network.

In some embodiments described herein, the uplink control channel, e.g. the HS-DPCCH, is boosted by the path gain ratio $G_{pico}/G_{macro}$. This ensures that the HS-DPCCH is reliably detected at the serving base station 610, i.e., the macro base station. In some embodiments, a fixed boosting factor, e.g. a worst case boosting factor, may be used, which fixed boosting factor is equal to the maximum path gain ratio shown above in equation (2). In some other embodiments described, a variable boosting factor may be used as the UE 613 moves throughout the extended SHO region. One option is to boost by the variable path gain ratio shown above in equation (1). This is based on the ratio of the received CPICH powers measured at the UE 613 and the ratio of the macro/pico transmit powers.

In some embodiments described herein, the boosting factor is used to boost the beta factor $\beta_{hs}$. Then, the boosted beta factor is used to set the power level of the uplink control channel, whereby the boosting of the uplink control channel is achieved.

Some First Type of Embodiments

Figure 7:
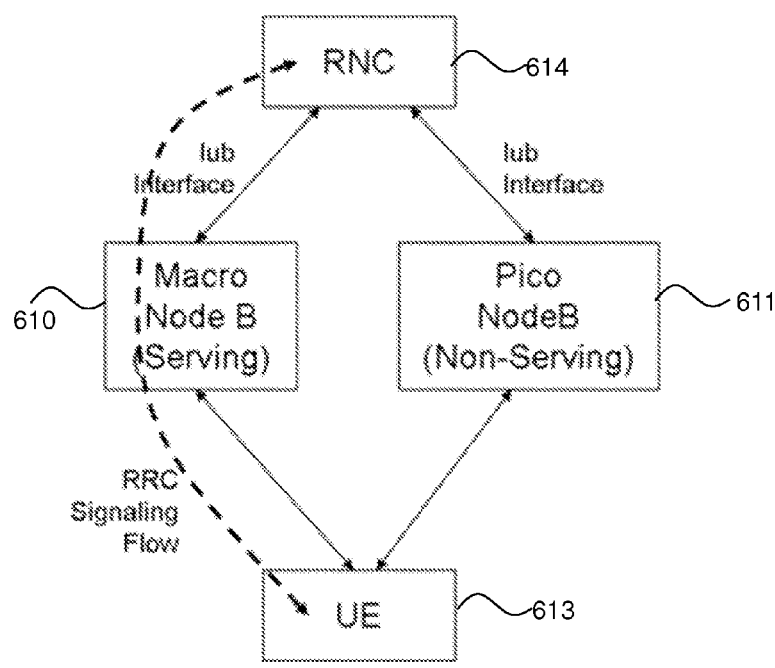
FIG. 7 schematically illustrates signalling flow between nodes.

Some first type of embodiments are RNC centric in that the RNC 614 takes control of when to configure uplink control channel boosting, e.g. HS-DPCCH boosting, and what boosting factor to apply. This is possible since the RNC 614 is intimately involved with the soft handover process, including extended soft handover, so it has knowledge of when the three conditions for boosting listed above are fulfilled. Furthermore, the RNC 614 has knowledge of the quantities required to compute the boosting factor. The received CPICH power levels, $P_{meas,pico}$ and $P_{meas,macro}$ are measured by the UE 613 and reported to the RNC 614 through RRC signalling, as is schematically illustrated in FIG. 7. FIG. 7 schematically illustrates the signalling flow between different nodes comprised in a communications system. It is assumed that the RNC 614 also has knowledge of the pico and macro transmit powers, $P_{TX,pico}$ and $P_{TX,macro}$, respectively, since network configuration information is typically available to the RNC 614 including base station capabilities.

With the foregoing knowledge, it is proposed that the RNC 614 indicates the beta factor $\beta_{hs}$ (with boosting applied) through RRC signaling to the UE 613. One variation is to signal $\beta_{hs}$ by itself. In another variation, it is signaled as part of the transport format table signaled to the UE 613 already today. In this way, the RNC 614 maintains control of when and by how much HS-DPCCH boosting is used. Either the fixed boosting factor, e.g. the worst case boosting factor, the variable boosting factor described previously or a combination thereof may be used.

In some embodiments, the term "beta factor $\beta_{hs}$ (with boosting applied)" refers to a new beta factor $\beta_{hs,new}$ which new beta factor corresponds to the beta factor $\beta_{hs}$ boosted with the boosting factor. Thus, in some embodiments, the boosting factor may be used to boost the beta factor $\beta_{hs}$ which boosted beta factor in turn may be used to set the power of the uplink control channel, whereby the boosting of the uplink control channel is achieved.

In some other variations of these first type of embodiments, the RNC 614 determines the variable boosting factor through other means. For example, the RNC 614 may not have up-to-date information on the measured received CPICH powers $P_{meas,pico}$ and $P_{meas,macro}$ since the UE 613 may not report them frequently. In this case, the RNC 614 may infer the path gain ratio needed for setting the boosting factor by observing the uplink data traffic, on e.g. the E-DCH, that is forwarded over the Iub interface between the NodeB 610 and RNC 614, see FIG. 7. With SHO, the RNC 614 is able to observe the ACK/NACKs from the multiple NodeBs involved in soft handover. Hence, it may get an idea about the relative downlink path gains. This is possible by translating the relative block error rate (BLER) to relative path gains which in turn may be used to set the boosting factor. For example, the relative ratio of BLERs, e.g., $BLER_{pico}/BLER_{macro}$, or some fraction thereof, may be used as an estimate of the path gain ratio, e.g. $G_{pico}/G_{macro}$, which in turn may be used to set the boosting factor.

To facilitate this, additional Iub signaling is proposed in which the NodeB 610 not only forwards an ACK to the RNC 614, as it does today, but also a NACK if the data is not decoded correctly. Alternatively, the NodeBs 610 in the active set could report block error rate to the RNC 614 over the Iub interface.

Some Second Type of Embodiments

Some second type of embodiments are NodeB 610 centric. These embodiments are similar in spirit to the some first embodiments described above, except that the boosting factor is instead indicated through layer 1 signaling, i.e. physical layer signaling, instead of higher layer signaling, i.e. RRC signaling. Here the RNC 614 indicates to the serving NodeB 610 that the UE 613 has entered the extended SHO region and that uplink control channel boosting, e.g. HS-DPCCH boosting, may be required. The macro NodeB 610 then introduces an extra Transmit Power Control (TPC) command for controlling the boosting factor used by the UE 613. The TPC command indicates whether the UE 613 should increase or decrease the beta factor $\beta_{hs}$ based on whether the NodeB 610 is having trouble decoding the uplink control channel, e.g. the HS-DPCCH, or not. In this way the regular TPC command, i.e. the existing TPC command, is used as today to control UE 613 transmit power, and the extra TPC command, i.e. the new TCP command, controls the fraction of the total power allocated to HS-DPCCH. With this approach, the HS-DPCCH power is decoupled from the regular power control loop.

One way of achieving this is to allocate one extra bit in the downlink Fractional Dedicated Physical Channel (F-DPCH) that carries the TPC commands today. This channel is a shared channel in which TPC commands for different users are time-multiplexed. With the proposed approach, each user may be allocated up to 2 bits.

In some variations of these embodiments, the HS-DPCCH boosting factor could be signaled from the NodeB 610 to UE 613 through a High Speed Shared Control Channel (HS-SCCH) order instead of using a separate power control loop for controlling the boosting factor. The order could be issued once for configuring the boosting factor or be issued periodically to realize a variable adjustment method.

Some Third Type of Embodiments

Some third type of embodiments are UE centric. The UE 613 has knowledge of the first two conditions for control channel boosting listed above. It also has knowledge of the CPICH powers, $P_{meas,pico}$ and $P_{meas,macro}$ since it is required by the standard to measure these and report them to the RNC 614. Hence the UE 613 may infer the third condition in the list, i.e. the extended SHO, if it is commanded by the RNC 614 to establish a SHO link to the pico base station 611 even though the measured CPICH power from the pico base station 611 is significantly less than that from the macro base station 610. By significantly less, it is meant that the SHO links are established even though the CPICH strengths fall outside the regular thresholds used SHO.

Once the UE 613 has knowledge of the 3 conditions, it autonomously configures uplink control channel boosting, e.g. HS-DPCCH boosting. Like in some other embodiments described, the UE 613 may configure a fixed boosting factor, e.g., a worst case boosting factor, or a variable boosting factor.

In one variation, the boosting factors may be as indicated by the equations (1) and (2) described above. In this case, the ratio of the NodeB 610 transmit powers is useful. This information may be obtained by signalling, e.g. new signalling, added to the Broadcast CHannel (BCH) where basic cell configuration information is signaled. This channel could be augmented to carry NodeB transmit powers.

In another variation, the UE 613 may obtain relative path gain information to configure the boosting factor by observing the ACK/NACKs transmitted on the E.DCH Hybrid ARQ Indicator Channel (E-HICH) sent from both the pico base station 611 and the macro base station 610. Like in some first type of embodiments described above, the relative ACK/NACK frequency may be translated to relative BLER which in turn may be translated to a path gain ratio used to set the boosting level.

In yet some other variations, the NodeB 610 signals a "nominal boosting factor" which is then scaled according to the path gain ratio. In practice the nominal boosting factor may depend on the BS power difference. Some form of fractional compensation may then be used. For example, a factor "alpha" in the form of the path gain ratio may be signaled from the NodeB 610 to control to what extent the base station power difference should be compensated. In this way fractional power control is achieved.

Figure 8:
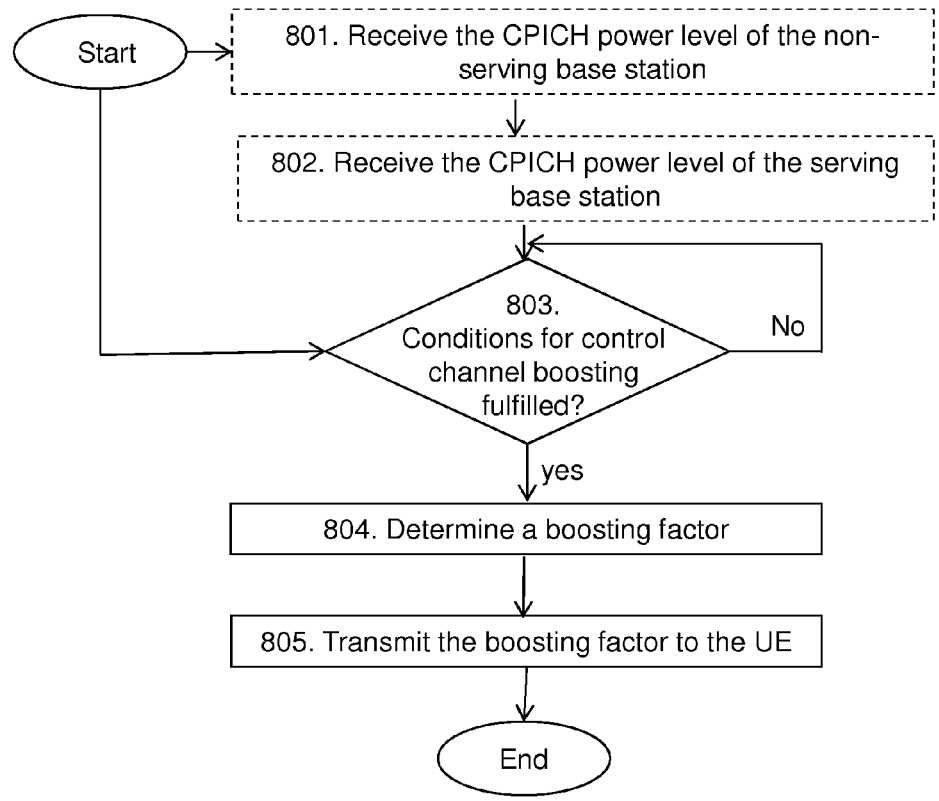
FIG. 8 is a flowchart depicting embodiments of a method in a radio network controller.

Some first type of embodiments will now be described in more detail with reference to FIGS. 8 and 9.

A method in a radio network controller 614 for enhancing reception quality of transmissions on an uplink control channel from the user equipment 613 to the serving base station 610 will now be described with reference to FIG. 8.

As previously mentioned, the radio network controller 614, the user equipment 613, the serving base station 610 and a non-serving base station 611 are comprised in the radio communications system 600. Further, the uplink control channel may be the HS-DPCCH.

The method comprises the following actions, which do not have to be performed in the order stated below, but may be taken in any suitable order. Further, actions may be combined.

Action 801

In some embodiments, which will be described in more detail below under Action 1004, the radio network controller 614 may determine a boosting factor based on path gains that have been determined based on received Common Pilot Channel (CPICH) power levels. Therefore, the radio network controller 614 may receive, from the user equipment 613, a measured received CPICH power level from the non-serving base station 611.

The radio network controller 614 may receive the measured received CPICH power level from the user equipment 613 via the serving base station 610 by means of Radio Resource Control (RRC) signalling. This is schematically illustrated in FIG. 7.

Action 802

As mentioned in Action 801 above, the radio network controller 614 may in some embodiments determine the boosting factor based on path gains that have been determined based on received CPICH power levels. Therefore, the radio network controller 614 may also receive, from the user equipment 613, a measured received CPICH power level from the serving base station 610.

As mentioned under Action 801 above, the radio network controller 614 may receive the measured received CPICH power level from the user equipment 613 via the serving base station 610 by means of RRC signalling. This is schematically illustrated in FIG. 7.

Action 803

As mentioned above, uplink control channel boosting may be accomplished when certain conditions for boosting the uplink control channel are fulfilled. Therefore, the radio network controller 614 determines whether or not one or more conditions for boosting the uplink control channel are fulfilled.

In some embodiments, the conditions for boosting the uplink control channel are fulfilled when an active set comprises a link to both a macro base station and a pico base station, when the macro base station is the serving base station 610, and when the communication system 600 is configured for extended Soft HandOver, SHO.

As previously mentioned, the collection of links between a user equipment 613 and one or more macro base stations and/or one or more pico base stations, and which collection of links participates in the SHO is referred to as the active set.

If the one or more conditions for boosting the uplink control channel are not fulfilled, no control channel boosting will be configured. Thus, the radio network controller 614 will wait until the one or more conditions are fulfilled before it determines and sends a boosting factor to the user equipment 613. This will be described in actions 804 and 805 below.

Action 804

When one or more conditions for boosting the uplink control channel are fulfilled, the radio network controller 614 determines the boosting factor based on a ratio of path gains of a channel from the user equipment 613 to the serving base station 610 and of a channel from the user equipment 613 to a non-serving base station 611, respectively. As mentioned above, the non-serving base station 611 is comprised in the communications system 600.

In some embodiments, the radio network controller 614 determines the boosting factor as a ratio between a first path gain, $G_{pico}$, and a second path gain, $G_{macro}$. The first path gain, $G_{pico}$, may be a path gain of a channel from the user equipment 613 to the non-serving base station 611, and the second path gain, $G_{macro}$, may be a path gain of a channel from the user equipment 613 to the serving base station 610.

In some embodiments, when for example the user equipment 613 is moving around in the extended soft handover region of the non-serving base station 611, the boosting factor is a variable boosting factor and is equal by path gain ratio given in equation (1) above. Thus, in such embodiments, the radio network controller 614 determines the boosting factor by determining the first path gain, $G_{pico}$, as a ratio between a CPICH power level, $P_{meas,pico}$, of the non-serving base station 611 and a CPICH transmit power level, $P_{TX,pico}$, of the non-serving base station 611. The CPICH power level, $P_{meas,pico}$, is the CPICH power level received and measured at the user equipment 613. Further, the radio network controller 614 determines the second path gain, $G_{macro}$, as a ratio between a CPICH power level, $P_{meas,macro}$, of the serving base station 610 and a CPICH transmit power level, $P_{TX,macro}$, of the serving base station 610. The CPICH power level, $P_{meas,macro}$, of the serving base station 610 is the CPICH power level received and measured at the user equipment 613.

In some other embodiments, when for example the network load is high, a worst case boosting factor may be used, since it saves one signalling load. In such embodiments, the boosting factor is a fixed boosting factor and is equal to the maximum path gain ratio that may occur in the soft handover region of the non-serving base station 611. The maximum path gain ratio is given by equation (2) above. Further, in such embodiments, the radio network controller 14 determines the boosting factor by determining the first path gain, $G_{pico}$, as an inverted value of a CPICH transmit power level, $P_{TX,pico}$, of the non-serving base station 611, and by determining the second path gain, $G_{macro}$, as an inverted value of a CPICH transmit power level, $P_{TX,macro}$, of the serving base station 610. The maximum value of the path gain ratio or a fraction thereof may be useful to know as a guide for setting a fixed boosting factor as some fraction of the maximum value. Thus, in some embodiments, the boosting factor may be determined based on the ratio $P_{TX,macro}/P_{TX,pico}$, e.g. as a fraction of the ratio $P_{TX,macro}/P_{TX,pico}$.

However, it should be understood that whether to use a variable boosting factor, a fixed boosting factor, or a combination of them, is a network deployment decision.

Further, in some embodiments, the radio network controller 614 may not have up-to-date information about the measured received CPICH power levels, $P_{meas,pico}$, $P_{meas,macro}$. In such embodiments, the radio network controller 614 may determine the ratio of path gains to the serving base station 610 and the non-serving base station 611, respectively, as a ratio of Block Error Rates (BLERs) to the serving base station 610 and the non-serving base station 611, respectively.

Action 805

The radio network controller 614 transmits the determined boosting factor to the user equipment 13. Thereby, the user equipment 613 may boost the uplink control channel by means of the boosting factor, whereby the reception quality of transmission on the uplink control channel from the user equipment 613 to the serving base station 610 may be enhanced.

Figure 9:
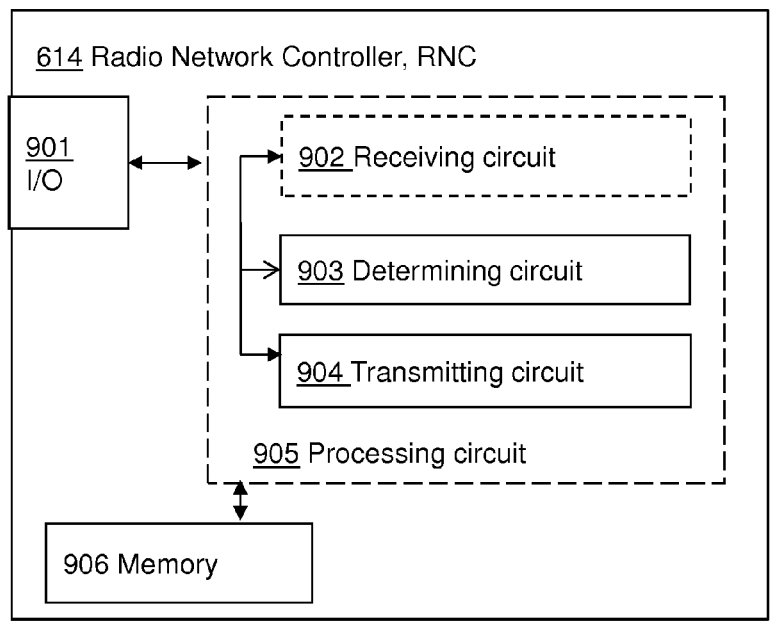
FIG. 9 is a schematic block diagram illustrating embodiments of a radio network controller.

To perform the method actions in the radio network controller 614 described above in relation to FIG. 8, the radio network controller 614 may comprise the following arrangement depicted in FIG. 9.

As previously mentioned, the radio network controller 614, the user equipment 613, the serving base station 610 and a non-serving base station 611 are comprised in the radio communications system 600.

The radio network controller 614 comprises an input and output interface 901 configured to function as an interface for communication in the communication system 600.

The radio network controller 614 may further comprise a receiving circuit 902 configured to receive, from the user equipment 613, a measured received CPICH power level, $P_{meas,pico}$, of the non-serving base station 611. Further the receiving circuit 902 may be configured to receive, from the user equipment 613, a measured received CPICH power level, $P_{meas,macro}$, of the serving base station 610. The measured received CPICH power levels are CPICH power levels of the respective serving base station 610 and the non-serving base station 611 which are received and measured at the user equipment 613.

As previously mentioned, the measured received CPICH power levels may be used when determining the boosting factor.

The radio network controller 614 comprises a determining circuit 903 configured to, when one or more conditions for boosting the uplink control channel are fulfilled, determine the boosting factor based on a ratio of path gains of a channel from the user equipment 613 to the serving base station 610 and of a channel from the user equipment 613 to a non-serving base station 611, respectively.

As previously mentioned, the one or more conditions for boosting the uplink control channel may be fulfilled when an active set, e.g. an active set of the user equipment 613, comprises a link to both a macro base station and a pico base station, when the macro base station is the serving base station 610, and when the communication system 600 is configured for extended Soft HandOver (SHO).

In some embodiments, the determining circuit 903 is further configured to determine the boosting factor as a ratio between a first path gain, $G_{pico}$, and a second path gain, $G_{macro}$. The first path gain, $G_{pico}$, may be a path gain of a channel from the user equipment 613 to the non-serving base station 611 and the second path gain, $G_{macro}$, may be a path gain of a channel from the user equipment 613 to the serving base station 610.

In some embodiments, when for example the user equipment 613 is moving around in the extended soft handover region of the non-serving base station 611, the boosting factor is a variable boosting factor and is equal by path gain ratio given in equation (1) above. Thus, in such embodiments, the determining circuit 903 is further configured to determine the first path gain, $G_{pico}$, as a ratio between a CPICH power level, $P_{meas,pico}$, of the non-serving base station 611 and a CPICH transmit power level, $P_{TX,pico}$, of the non-serving base station 611. The CPICH power level, $P_{meas,pico}$, the non-serving base station 611 is the CPICH power level received and measured at the user equipment 613. Further, the determining circuit 903 is configured to determine the second path gain, $G_{macro}$, as a ratio between a CPICH power level, $P_{meas,pico}$, of the serving base station 610 and a CPICH transmit power level, $P_{TX,macro}$, of the serving base station 10. The CPICH power level, $P_{meas,macro}$, of the serving base station 610 is the CPICH power level received and measured at the user equipment 613.

As mentioned above, in some other embodiments, a worst case boosting factor may be used. In such embodiments, the boosting factor is a fixed boosting factor and is equal to the maximum path gain ratio that may occur in the soft handover region of the non-serving base station 611. The maximum path gain ratio is given by equation (2) above. Further, in such embodiments, the determining circuit 903 is further configured to determine the first path gain, $G_{pico}$, as an inverted value of a CPICH transmit power level of the non-serving base station 611. Further, in such embodiments, the determining circuit 903 is further configured to determine the second path gain, $G_{pico}$, as an inverted value of a CPICH transmit power level of the serving base station 10. As previously mentioned, the maximum value of the path gain ratio or a fraction thereof may be useful to know a guide for setting a fixed boosting factor as some fraction of the maximum. Thus, in some embodiments, the boosting factor may be determined based on the ratio $P_{TX,macro}/P_{TX,pico}$, e.g. as a fraction of the ratio $P_{TX,macro}/P_{TX,pico}$.

Further, in some embodiments, the radio network controller 614 may not have up-to-date information about the measured received CPICH power levels, $P_{meas,pico}$, $P_{meas,macro}$. In such embodiments, the determining circuit 903 may be configured to determine the ratio of path gains to the serving base station 610 and the non-serving base station 611, respectively, as a ratio of Block Error Rates (BLERs) to the serving base station 610 and the non-serving base station 611, respectively.

The radio network controller 614 comprises further a transmitting circuit 904 configured to transmit the determined boosting factor to the user equipment 613, whereby user equipment 613 may boost the control channel by means of the boosting factor. Thereby, the reception quality of transmission on the uplink control channel from the user equipment 613 to the serving base station 610 may be enhanced.

Embodiments herein for enhancing reception quality of transmissions on an uplink control channel from the user equipment 613 to the serving base station 610 may be implemented through one or more processors, such as a processing circuit 905 in the arrangement depicted in FIG. 9, together with computer program code for performing the functions and/or method actions of embodiments herein.

It should be understood that one or more of the circuits comprised in the radio network controller 614 described above may be integrated with each other to form an integrated circuit.

The radio network controller 614 may further comprise a memory 906. The memory may comprise one or more memory units and may be used to store for example data such as thresholds, predefined or pre-set information, etc.

Figure 10:
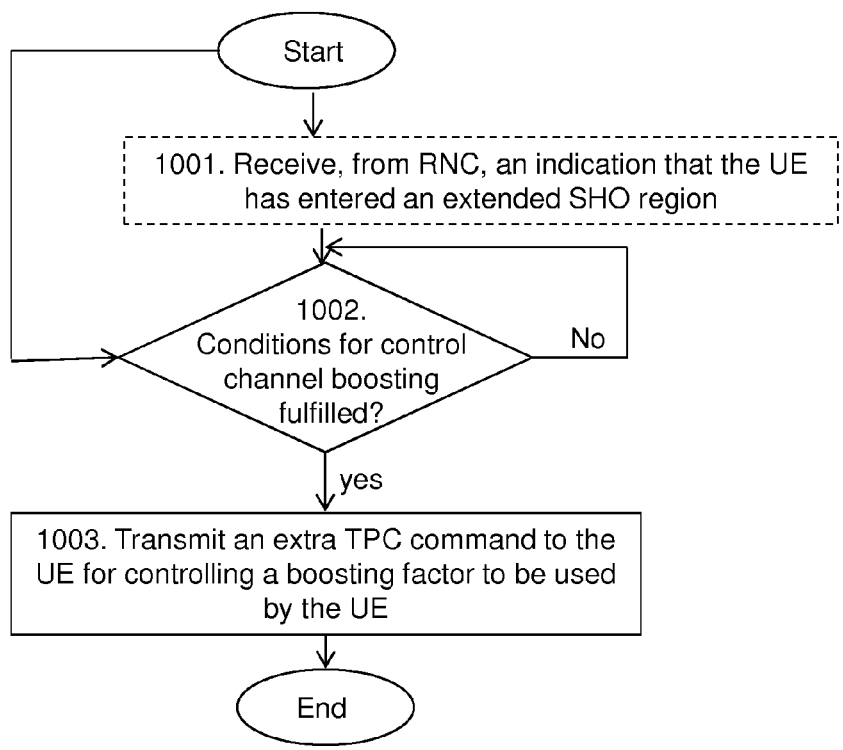
FIG. 10 is a flowchart depicting embodiments of a method in a serving base station.

Some second type of embodiments will now be described in more detail with reference to FIGS. 10 and 11.

A method in a serving base station 610 for enhancing reception quality of transmissions on an uplink control channel from the user equipment 613 to the serving base station 610 will now be described with reference to FIG. 10.

As previously mentioned, the user equipment 613, the radio network controller 614, and the serving base station 610 are comprised in the radio communications system 600. Further, the uplink control channel may be the HS-DPCCH.

The method comprises the following actions, which do not have to be performed in the order stated below, but may be taken in any suitable order. Further, actions may be combined.

Action 1001

When the user equipment 613 has entered an extended Soft Handover (SHO) region, the serving base station 610 receives, from a radio network controller 614, an indication that the user equipment 613 has entered the extended SHO region. The indication may also indicate to the serving base station 610 that boosting of the uplink control channel may be required.

Action 1002

In order to determine whether or not boosting of the uplink control channel should be accomplished, the serving base station 610 determines whether or not one or more conditions for boosting the uplink control channel are fulfilled. The one or more conditions for boosting the uplink control channel are fulfilled when an active set comprises a link to both a macro base station and a pico base station, when the macro base station is the serving base station 610, and when the communication system 600 is configured for extended SHO.

In some embodiments, whether or not the one or more conditions for boosting the uplink control channel are met is implicit in the signaling that the radio network controller 614 performs towards the serving base station 610. For example, if the radio network controller 614 does not signal anything to the serving base station 610 that imply to the serving base station 610 that the one or more conditions for boosting of the uplink control channel are not fulfilled.

If the one or more conditions for boosting the uplink control channel are not fulfilled, consequently no control channel boosting will be configured. Thus, the serving base station 610 will wait until the one or more conditions are fulfilled before it configures the transmission of and/or transmits an extra Transmit Power Control (TPC) command to the user equipment 613. This will be described in actions 1003 below.

Action 1003

When conditions for boosting the uplink control channel are fulfilled, the serving base station 610 transmits an extra Transmit Power Control (TPC) command to the user equipment 613 for controlling a boosting factor used by the user equipment 613. By means of the extra TPC command, the user equipment 613 may adjust the boosting factor to be used for boosting the control channel by fixed step sizes up or down. Thereby, the reception quality of transmission on the uplink control channel from the user equipment 613 to the serving base station 610 may be enhanced.

In some embodiments, serving base station 610 transmits a control command to the user equipment 613. The control command may comprise a first part configured to control the transmit power of the user equipment 613 and a second part may comprise the extra TPC command that is configured to control a fraction of a total transmit power of the user equipment 613 which fraction is to be allocated for the uplink control channel.

The extra TPC command and/or the control command may be transmitted from the serving base station 610 to the user equipment 613 on the Fractional Dedicated Physical Channel (F-DPCCH).

Figure 11:
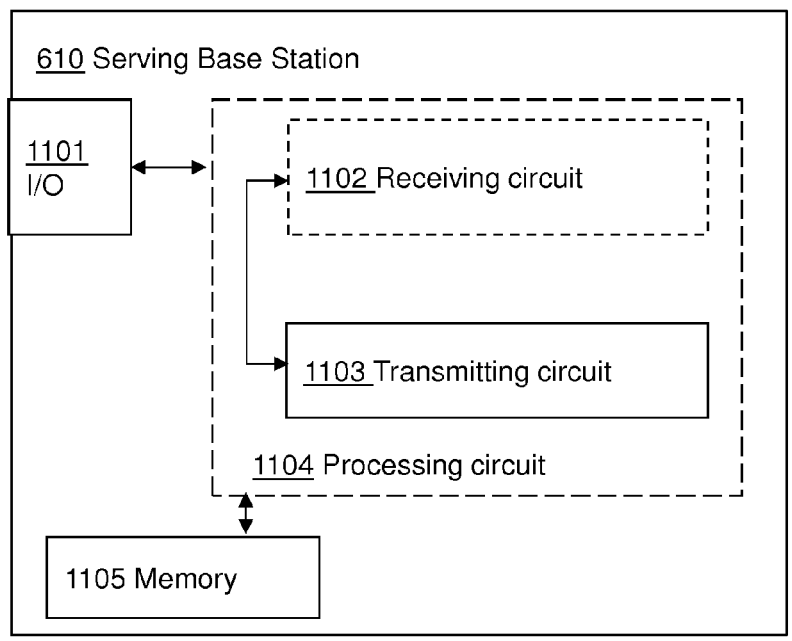
FIG. 11 is a schematic block diagram illustrating embodiments of a serving base station.

To perform the method actions in the serving base station 610 described above in relation to FIG. 10, the serving base station 610 may comprise the following arrangement depicted in FIG. 11.

As previously mentioned, the serving base station 610 and the user equipment 613 are comprised in the radio communications system 600.

The serving base station 610 comprises an input and output interface 1101 configured to function as an interface for communication in the communication system 600.

In some embodiments, the serving base station 610 further comprises a receiving circuit 1102 configured to, when the user equipment 613 has entered an extended Soft Handover (SHO) region, receive an indication that the user equipment 613 has entered the extended SHO region. The indication may be received from a radio network controller 614 comprised in the communication system 600.

The serving base station 610 comprises a transmitting circuit 1103 configured to transmit an extra Transmit Power Control (TPC) command to the user equipment 613 for controlling a boosting factor used by the user equipment 613, when one or more conditions for boosting the uplink control channel are fulfilled. By means of the extra TPC command, the user equipment 613 may adjust the boosting factor to be used for boosting the control channel by fixed step sizes up or down. Thereby, the reception quality of transmission on the uplink control channel from the user equipment 613 to the serving base station 610 may be enhanced.

The one or more conditions for boosting the uplink control channel may be fulfilled when an active set comprises a link to both a macro base station and a pico base station, when the macro base station is the serving base station 610, and when the communication system 600 is configured for extended Soft HandOver (SHO).

As previously mentioned, in some embodiments, whether or not the one or more conditions for boosting the uplink control channel are met is implicit in the signaling that the radio network controller 614 performs towards the serving base station 610. For example, if the radio network controller 614 does not signal anything to the serving base station 610 that imply that the one or more conditions for boosting the uplink control channel are not fulfilled.

In some embodiments, transmitting circuit 1103 is configured to transmit a control command to the user equipment 613. The control command may comprise a first part configured to control the transmit power of the user equipment 613 and a second part may comprise the extra TPC command that is configured to control a fraction of a total transmit power of the user equipment 613 which fraction is to be allocated for the uplink control channel.

The extra TPC command and/or the control command may be transmitted by the transmitting circuit 1103 to the user equipment 613 on the Fractional Dedicated Physical Channel (F-DPCCH).

Embodiments herein for enhancing reception quality of transmissions on an uplink control channel from the user equipment 613 to the serving base station 610 may be implemented through one or more processors, such as a processing circuit 1104 in the arrangement depicted in FIG. 11, together with computer program code for performing the functions and/or method actions of embodiments herein.

It should be understood that one or more of the circuits comprised in the serving base station 610 described above may be integrated with each other to form an integrated circuit.

The serving base station 610 may further comprise a memory 1105. The memory may comprise one or more memory units and may be used to store for example data such as thresholds, predefined or pre-set information, etc.

Figure 12:
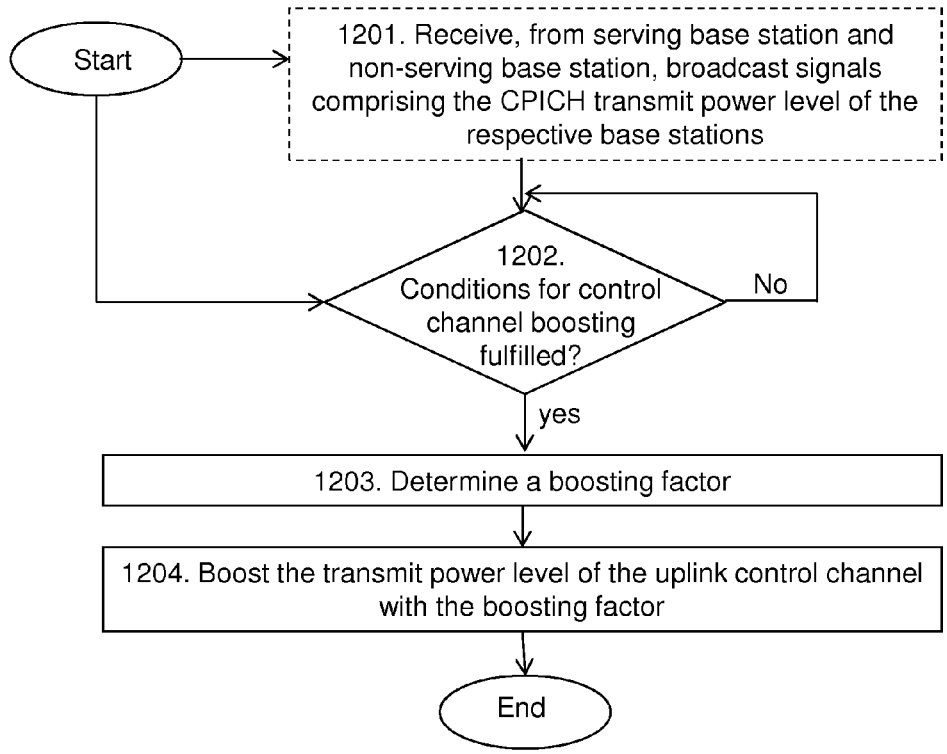
FIG. 12 is a flowchart depicting embodiments of a method in a user equipment.

Some third type of embodiments will now be described with reference to FIGS. 12 and 13.

A method in a user equipment 613 for enhancing reception quality of transmissions on an uplink control channel from the user equipment 613 to the serving base station 610 will now be described with reference to FIG. 12.

As previously mentioned, the user equipment 613, the serving base station 610, and a non-serving base station 611 are comprised in the radio communications system 600. Further, the uplink control channel may be the HS-DPCCH.

The method comprises the following actions, which do not have to be performed in the order stated below, but may be taken in any suitable order. Further, actions may be combined.

Action 1201

In some embodiments, the user equipment 613 receives, from the serving base station 610 and from the non-serving base station 611, broadcast signals comprising the CPICH transmit power level, $P_{TX,macro}$, of the serving base station 610 and the CPICH transmit power level, $P_{TX,pico}$, of the non-serving base station 611, respectively.

As will be described in relation to Action 1203 below, the CPICH transmit power levels, $P_{TX,macro}$, $P_{TX,pico}$, may be used in the determination of a boosting factor.

Action 1202

In order to determine whether or not boosting of the uplink control channel should be accomplished, the user equipment 613 determines whether or not one or more conditions for boosting the uplink control channel are fulfilled.

The one or more conditions for boosting the uplink control channel are fulfilled when an active set comprises a link to both a macro base station and a pico base station, when the macro base station is the serving base station 610, and when the communication system 600 is configured for extended Soft HandOver (SHO).

In some embodiments, the user equipment 613 may infer the third condition, i.e. the extended SHO configuration of the communication system 600, if it is commanded by the radio network controller 614 to establish a SHO link to the non-serving base station 611 even if the measured CPICH power from the non-serving base station 611 is significantly less than the measured CPICH power from the serving base station 610.

If the one or more conditions for boosting the uplink control channel are not fulfilled, the user equipment 613 will not perform any boosting of the uplink control channel.

Action 1203

When one or more conditions for boosting the uplink control channel are fulfilled, the user equipment 613 determines the boosting factor based on a ratio of path of a channel gains from the user equipment 613 to the serving base station 610 and of a channel from the user equipment 613 to the non-serving base station 611, respectively.

The user equipment 613 may determine the boosting factor as a ratio between a first path gain, $G_{pico}$, and a second path gain, $G_{macro}$. The first path gain may be a path gain, $G_{pico}$, of a channel from the user equipment 613 to the non-serving base station 611, and the second path gain, $G_{macro}$ may be a path gain of a channel from the user equipment 613 to the serving base station 610.

In some embodiments, when for example the user equipment 613 is moving around in the extended soft handover region of the non-serving base station 611, the boosting factor is a variable boosting factor and is equal by path gain ratio given in equation (1) above. Thus, in such embodiments, the user equipment 613 determines the first path gain, $G_{pico}$, as a ratio between a CPICH power level, $P_{meas,pico}$ of the non-serving base station 611 and a CPICH transmit power level, $P_{meas,pico}$, of the non-serving base station 611. The CPICH power level, $P_{meas,pico}$, of the non-serving base station 611 is the CPICH power level received and measured at the user equipment 613. Further, the user equipment 613 determines the second path gain, $G_{macro}$, as a ratio between a CPICH power level, $P_{meas,macro}$ of the serving base station 610 and a CPICH transmit power level, $P_{TX,macro}$ of the serving base station 610. The CPICH power level, $P_{meas,macro}$ of the serving base station 610 is the CPICH power level received and measured at the user equipment 613.

As previously described, in some other embodiments, a worst case boosting factor may be used. In such embodiments, the boosting factor is a fixed boosting factor and is equal to the maximum path gain ratio that may occur in the soft handover region of the non-serving base station 611. The maximum path gain ratio is given by equation (2) above. Further, in such embodiments, the user equipment 613 determines the first path gain as an inverted value of a CPICH transmit power level of the non-serving base station 611, and the second path gain as an inverted value of a CPICH transmit power level of the serving base station 610.

In some embodiments, the user equipment 613 receives the transmit power levels from the base stations 610, 611 by means of signalling added to the broadcast channel (BCH).

Further, the user equipment 613 may determine the ratio of path gains to the serving base station 610 and the non-serving base station 611, respectively, as a ratio of Block Error Rates, BLERs, to the serving base station 610 and the non-serving base station 611, respectively. This may for example be the case when the user equipment 613 does not have up-to-date information about the CPICH transmit power levels, $P_{TX,pico}$, $P_{TX,macro}$.

In some embodiments, the user equipment 613 determines the boosting factor based on a nominal boosting factor received from the serving base station 610, which nominal boosting factor the user equipment 613 scales with the boosting factor determined based on the ratio of base station power levels or a fraction thereof. Thus, the user equipment 613 may use a fraction of the nominal boosting factor. For example, the nominal boosting factor may be the maximum path gain ratio from equation (2) mentioned above. Both the nominal boosting factor and the fraction may be signalled to the user equipment 613. In some embodiments, the nominal boosting factor would only be signalled once, while the fraction is signalled on an ongoing basis. For example, the signalling could be RRC type signalling from the radio network controller 614 through the serving base station 610 down to the user equipment 613. Thus, in these embodiments, the user equipment 613 is under control of the network 600 as to what boosting to apply, while the previously described embodiments describe a more autonomous mode of operation for the user equipment 613, wherein the user equipment 613 autonomously determines when to boost the control channel and what boosting factor to apply.

Action 1204

The user equipment 613 boosts the transmit power level of the uplink control channel with the determined boosting factor. Thereby, the reception quality of transmission on the uplink control channel from the user equipment 613 to the serving base station 610 is enhanced.

For example, in UMTS, the user equipment 613 determines the absolute power levels of the various control and data channels through a set of so-called beta factors which describe a power offset of each channel individually with respect to the power of DPCCH control channel. As previously described, in some embodiments herein, the beta factor called beta_hs ($\beta_{hs}$) is the beta factor of interest. If a certain boosting level, e.g. x dB, is to be applied to the uplink control channel, the user equipment 613 would adjust the beta factor, e.g. boost the beta factor, with the determined boosting factor, so as to accomplish the x dB of power boost to the uplink control channel.

Figure 13:
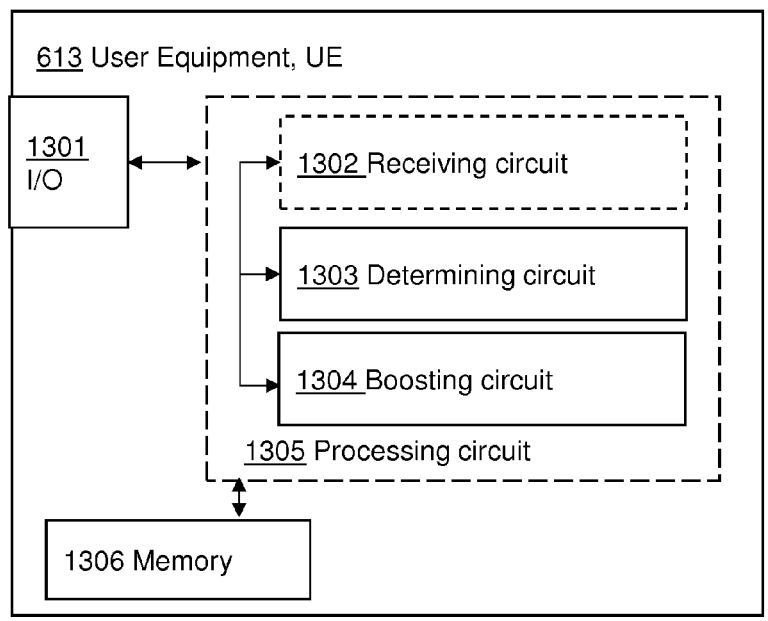
FIG. 13 is a schematic block diagram illustrating embodiments of a user equipment.

To perform the method actions in the user equipment 613 described above in relation to FIG. 12, the user equipment 613 may comprise the following arrangement depicted in FIG. 13.

As previously mentioned, the user equipment 613, the serving base station 610 and a non-serving base station 611 are comprised in the radio communications system 600.

The user equipment 613 comprises an input and output interface 1301 configured to function as an interface for communication in the communication system 600.

In some embodiments, the user equipment 613 further comprises a receiving circuit 1302 configured to receive broadcast signals from the serving base station 610 and from the non-serving base station 611, which broadcast signals comprise the CPICH transmit power level of the serving base station 610 and the CPICH transmit power level of the non-serving base station 611, respectively.

The receiving circuit 1302 may further be configured to receive a nominal boosting factor from the serving base station 610, which may be used in the determination of the boosting factor as will be described below.

The user equipment 613 comprises a determining circuit 1303 configured to, when one or more conditions for control channel boosting are fulfilled, determine a boosting factor based on a ratio of path gains from the user equipment 613 to the serving base station 610 and from the user equipment 613 to a non-serving base station 611, respectively.

As previously mentioned, the one or more conditions for boosting of the uplink control channel may be fulfilled when an active set comprises a link to both a macro base station and a pico base station, when the macro base station is the serving base station 10, and when the communication system 600 is configured for extended Soft HandOver (SHO).

In some embodiments, the determining circuit 1303 is further configured to determine the boosting factor as a ratio between a first path gain and a second path gain. The first path gain is a path gain of a channel from the user equipment 613 to the non-serving base station and the second path gain is a path gain of a channel from the user equipment 613 to the serving base station 610.

The determining circuit 1303 may be configured to determine the first path gain as a ratio between a CPICH power level of the non-serving base station 611 and a CPICH transmit power level of the non-serving base station 611. The CPICH power level of the non-serving base station 611 is the CPICH power level received and measured at the user equipment 613. Further, the determining circuit 1303 may be configured to determine the second path gain as a ratio between a CPICH power level of the serving base station 610 and a CPICH transmit power level of the serving base station 610. The CPICH power level of the serving base station 610 is the CPICH power level received and measured at the user equipment 613.

In some embodiments, wherein the boosting factor is a fixed boosting factor, the determining circuit 1303 may further be configured to determine the first path gain as an inverted value of a CPICH transmit power level of the non-serving base station 611, and to determine the second path gain as an inverted value of a CPICH transmit power level of the serving base station 610.

As mentioned above, the receiving circuit 1302 may further be configured to receive a nominal boosting factor from the serving base station 610. In such embodiments, the determining circuit 1303 may use the nominal boosting factor when determining the boosting factor. For example, the determining circuit 1303 may be configured to scale the nominal boosting factor with the boosting factor determined based on the ratio of base station power levels or a fraction thereof as described above. Thus, the determining circuit 1303 may use a fraction of the nominal boosting factor. For example, the nominal boosting factor may be the maximum path gain ratio from equation (2) mentioned above. Both the nominal boosting factor and the fraction may be signalled to the user equipment 613. In some embodiments, the nominal boosting factor would only be signalled once, while the fraction is signalled on an ongoing basis. For example, the signalling could be RRC type signalling from the radio network controller 614 through the serving base station 610 down to the user equipment 613. Thus, in these embodiments, the determining circuit 1303 of the user equipment 613 is under control of the network 600 as to what boosting to apply, while the previously described embodiments describe a more autonomous mode of operation for the user equipment 613, wherein the determining circuit 1303 of the user equipment 613 autonomously determines when to boost the control channel and what boosting factor to apply.

In some embodiments, the determining circuit 1303 is configured to determine the ratio of path gains to the serving base station 610 and the non-serving base station 611, respectively, as a ratio of Block Error Rates (BLERs) to the serving base station 610 and the non-serving base station 611, respectively.

The user equipment 613 comprises further a boosting circuit 1304 configured to boost the transmit power level of the uplink control channel with the determined boosting factor. Thereby, the reception quality of transmission on the uplink control channel from the user equipment 613 to the serving base station 610 is enhanced.

For example, in UMTS, the determining circuit 1303 of the user equipment 613 determines the absolute power levels of the various control and data channels through a set of so-called beta factors which describe a power offset of each channel individually with respect to the power of DPCCH control channel. As previously described, in some embodiments herein, the beta factor called beta_hs ($\beta_{hs}$) is the beta factor of interest. If a certain boosting level, e.g. x dB, is to be applied to the uplink control channel, the boosting circuit 1304 would adjust the beta factor, e.g. boost the beta factor, with the determined boosting factor, so as to accomplish the x dB of power boost to the uplink control channel.

Embodiments herein for enhancing reception quality of transmissions on an uplink control channel from the user equipment 613 to the serving base station 610 may be implemented through one or more processors, such as a processing circuit 1305 in the arrangement depicted in FIG. 13, together with computer program code for performing the functions and/or method actions of embodiments herein.

It should be understood that one or more of the circuits comprised in the user equipment 613 described above may be integrated with each other to form an integrated circuit.

The user equipment 613 may further comprise a memory 1306. The memory may comprise one or more memory units and may be used to store for example data such as thresholds, predefined or pre-set information, etc.

Figure 14:
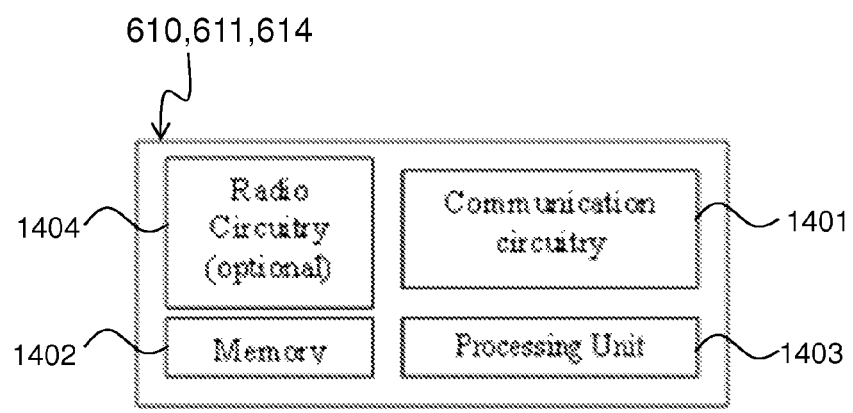
FIG. 14 is a schematic block diagram illustrating embodiments of an exemplary network node.

Thus, according to various embodiments, a network node, such as a RBS 610,611 or a RNC 614 etc, in a wireless radio communications network is provided. According to some embodiments, the network node is adapted to configure control channel boosting based on a ratio of path gains to a serving base station 610 and a non-serving base station 611. One example of such a network node 610,611,614 is shown in FIG. 14. In some embodiments, the network node comprises communication circuitry 1401 arranged to communicate with other radio network nodes 610,611,614 and core network nodes, a memory 1402 arranged to store information, and a processing unit 1403. When the network node is a base station 610,611, it comprises radio circuitry 1404 arranged to communicate with served user nodes 613.

The communication circuitry 1401, the memory 1402, the processing unit 1403 and the optional radio circuitry 1404 relate to the input and output interface 901, the receiving circuit 902, the determining circuit 903, the transmitting circuit 904, the processing circuit 905 and the memory 906 of the radio network controller 613 described above with reference to FIG. 9.

Further, the communication circuitry 1401, the memory 1402, the processing unit 1403 and the optional radio circuitry 1404 relate to the input and output interface 1101, the receiving circuit 1102, the transmitting circuit 1103, the processing circuit 1104 and the memory 1105 of the serving base station 610 described above with reference to FIG. 11.

Figure 15:
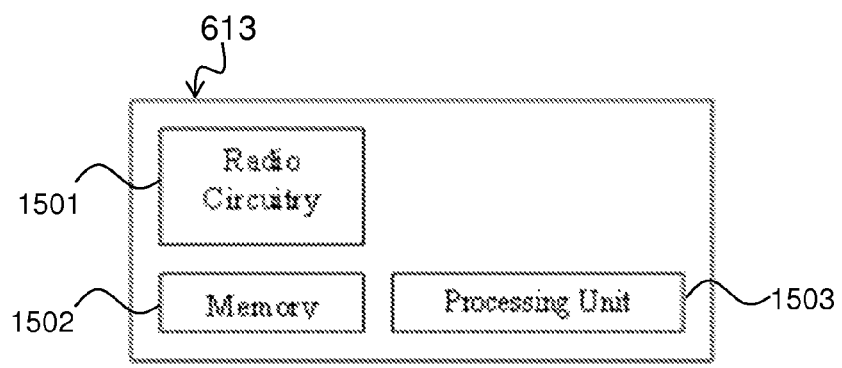
FIG. 15 is a schematic block diagram illustrating embodiments of an exemplary user equipment.

The network node may also be a user node 613, such as a UE (mobile station), a telemetry node, a communication node in a car, or any type of node communicating in a radio network system. One example of a user node is shown in FIG. 15. The user node 613 is provided and adapted to configure control channel boosting based on a ratio of path gains to a serving base station 610 and a non-serving base station 611. In some embodiments, the user node 613 comprises radio circuitry 1501 to communicate with radio network nodes, a memory 1502 to store information and a processing unit 1503.

The radio circuitry 1501, the memory 1502, and the processing unit 1503 relate to the input and output interface 1301, the receiving circuit 1302, the determining circuit 1303, the boosting circuit 1304, the processing circuit 1305, and the memory 1306 of the user equipment 613 described above with reference to FIG. 13.

According to some embodiments, methods in network nodes and/or user nodes are provided for configuring control channel boosting based on a ratio of path gains to a serving and a non-serving base station.

Example Implementations

Although the described solutions may be implemented in any appropriate type of telecommunication system supporting any suitable communication standards and using any suitable components, particular embodiments of the described solutions may be implemented in an LTE network, such as that illustrated in FIG. 6.

As shown in FIG. 6, the example communications network 600 may include one or more instances of user equipment (UEs) 613 and one or more base stations 610,611 capable of communicating with these UEs 613, along with any additional elements suitable to support communication between UEs 613 or between a UE 613 and another communication device (such as a landline telephone). Although the illustrated UEs 613 may represent communication devices that include any suitable combination of hardware and/or software, these UEs may, in particular embodiments, represent devices such as the example UE 613 illustrated in greater detail by FIG. 16. Similarly, although the illustrated base stations 610,611 may represent network nodes that include any suitable combination of hardware and/or software, these base stations 610,611 may, in particular embodiments, represent devices such as the example base station 610,611 illustrated in greater detail by FIG. 17.

Figure 16:
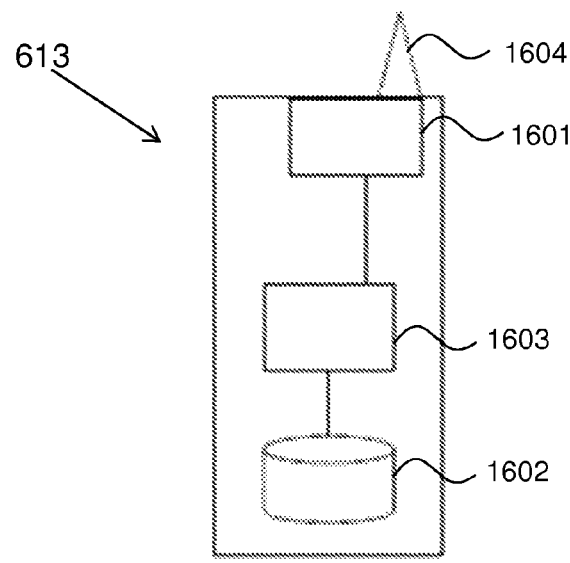
FIG. 16 is a schematic block diagram illustrating embodiments of an exemplary user equipment.

As shown in FIG. 16, the example UE 613 comprises a transceiver 1601, a memory 1602, a processor 1603, and an antenna 1604, which relate to the radio circuitry 1501, the memory 1502 and the processing unit 1503 mentioned above in relation to FIG. 15. In particular embodiments, some or all of the functionality described above as being provided by mobile communication devices or other forms of UE 613 may be provided by the UE processor executing instructions stored on a computer-readable medium, such as the memory shown in FIG. 16. Alternative embodiments of the UE may include additional components beyond those shown in FIG. 16 that may be responsible for providing certain aspects of the UE's functionality, including any of the functionality described above and/or any functionality necessary to support the solution described above.

Figure 17:
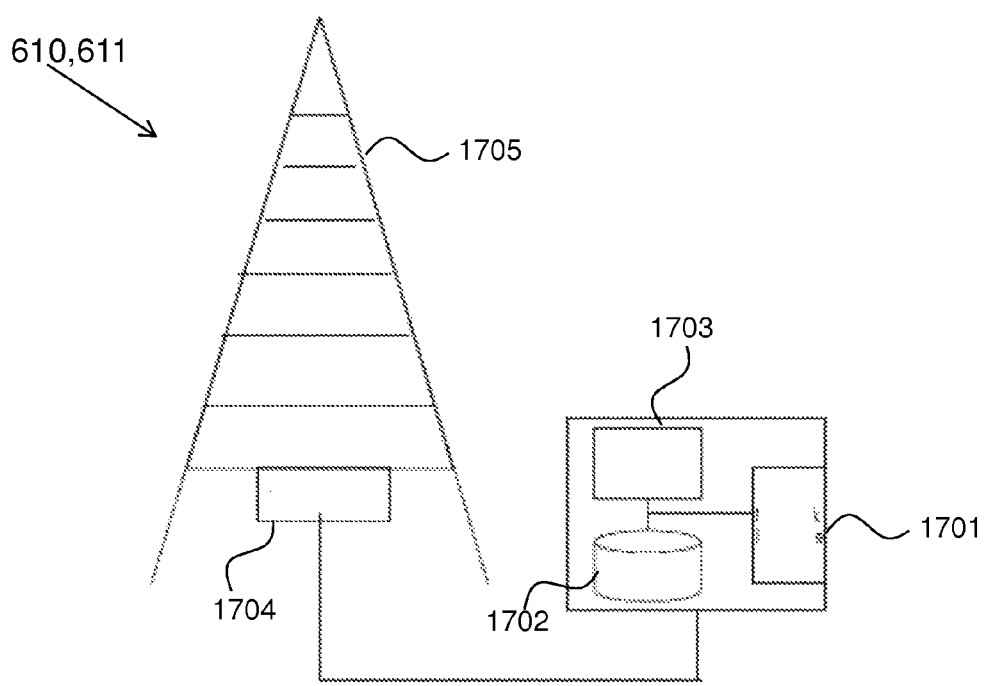
FIG. 17 is a schematic block diagram illustrating embodiments of an exemplary base station.

As shown in FIG. 17, the example base station 610,611 comprises a network interface 1701, a memory 1702, a processor 1703, a transceiver 1704, and an antenna 1705, which relate to the communication circuitry 1401, the memory 1402, the processing unit 1403 and the optional radio circuitry 1404 described above in relation to FIG. 14. In particular embodiments, some or all of the functionality described above as being provided by a mobile base station, a base station controller, a node B, an enhanced node B, and/or any other type of mobile communications node may be provided by the base station processor executing instructions stored on a computer-readable medium, such as the memory shown in FIG. 17. Alternative embodiments of the base station may include additional components responsible for providing additional functionality, including any of the functionality identified above and/or any functionality necessary to support the solution described above.

ABBREVIATIONS

ACK Acknowledge
ARQ Automatic Repeat Request
CQI Channel Quality Information
DPCCH Dedicated Physical Control Channel
E-DCH Enhanced Dedicated Channel
E-HICH E-DCH Hybrid ARQ Indicator Channel
E-RGCH E-DCH Relative Grant Channel
F-DPCH Fractional Dedicated Physical Channel
HS-DPCCH High Speed Dedicated Physical Control Channel
HSPA High Speed Packet Access
HS-SCCH High Speed Shared Control Channel
LTE Long Term Evolution
NACK Not Acknowledge
RBS Radio Base Station
RNC Radio Network Controller
RRC Radio Resource Control
UE User Equipment Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of consist at least of.

When using the word action/actions it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described examples. Various alternatives, modifications and equivalents may be used. Therefore, the above examples should not be taken as limiting the scope of the invention, which is defined by the appending claims.

The invention claimed is:

1. A method, in a radio network controller, for enhancing reception quality of transmissions on an uplink control channel from a user equipment to a serving base station, wherein the radio network controller, the user equipment, the serving base station, and a non-serving base station are comprised in a communication system, the method comprising:
    determining, when conditions for boosting the uplink control channel are fulfilled, a boosting factor based on a ratio of path gains of a channel from the user equipment to the serving base station and of a channel from the user equipment to the non-serving base station, respectively, wherein the ratio of path gains comprises a first path gain and a second path gain, the first path gain is a path gain of the channel from the user equipment to the non-serving base station and the second path gain is a path gain of the channel from the user equipment to the serving base station; and
    transmitting the determined boosting factor to the user equipment, whereby the reception quality of transmissions on the uplink control channel from the user equipment to the serving base station is enhanced by the user equipment boosting the uplink control channel based on the boosting factor.

2. The method of claim 1:
wherein the boosting factor is a variable boosting factor;
wherein determining the boosting factor comprises:
    determining the first path gain as a ratio between a Common Pilot Channel (CPICH) power level of a CPICH of the non-serving base station, as received and measured at the user equipment, and a CPICH transmit power level of the non-serving base station; and
    determining the second path gain as a ratio between a CPICH power level of a CPICH of the serving base station, as received and measured at the user equipment, and a CPICH transmit power level of the serving base station.

3. The method of claim 2, further comprising:
receiving, from the user equipment via the serving base station, the CPICH power level of the non-serving base station; and
receiving, from the user equipment via the serving base station, the CPICH power level of the serving base station.

4. The method of claim 1:
wherein the determining the boosting factor comprises determining the boosting factor only once and by:
determining the first path gain as an inverted value of a CPICH transmit power level of the non-serving base station; and
determining the second path gain as an inverted value of a CPICH transmit power level of the serving base station.

5. The method of claim 1, wherein determining the boosting factor comprises determining the ratio of path gains to the serving base station and the non-serving base station, respectively, as a ratio of Block Error Rates to the serving base station and the non-serving base station, respectively.

6. The method of claim 1, wherein the conditions for boosting the uplink control channel are fulfilled when each of the following is true:
an active set comprises a link to both a macro base station and a pico base station;
the macro base station is the serving base station; and
the communication system is configured for extended Soft Handover.

7. A radio network controller for enhancing reception quality of transmissions on an uplink control channel from a user equipment to a serving base station, wherein the radio network controller, the user equipment, and the serving base station, and a non-serving base station are comprised in a communication system; and wherein the radio network controller comprises:
a determining circuit configured to, when conditions for boosting the uplink control channel are fulfilled, determine a boosting factor based on a ratio of path gains of a channel from the user equipment to the serving base station and of a channel from the user equipment to the non-serving base station, respectively, wherein the ratio of path gains comprises a first path gain and a second path gain, the first path gain is a path gain of the channel from the user equipment to the non-serving base station and the second path gain is a path gain of the channel from the user equipment to the serving base station;
a transmit circuit configured to transmit the determined boosting factor to the user equipment, whereby the reception quality of transmissions on the uplink control channel from the user equipment to the serving base station is enhanced by the user equipment boosting the uplink control channel based on the boosting factor.

8. A method, in a user equipment, for enhancing reception quality of transmissions on an uplink control channel from the user equipment to a serving base station, wherein the user equipment, the serving base station, and a non-serving base station are comprised in a communication system; the method comprising:
determining, when conditions for boosting the uplink control channel are fulfilled, a boosting factor based on a ratio of path gains of a channel from the user equipment to the serving base station and of a channel from the user equipment to the non-serving base station, respectively, wherein the ratio of path gains comprises a first path gain and a second path gain, the first path gain is a path gain of the channel from the user equipment to the non-serving base station and the second path gain is a path gain of the channel from the user equipment to the serving base station; and
boosting a transmit power level of the uplink control channel based on the determined boosting factor, whereby the reception quality of transmissions on the uplink control channel from the user equipment to the serving base station is enhanced.

9. The method of claim 8, wherein determining the boosting factor comprises:
determining the first path gain as a ratio between a Common Pilot Channel (CPICH) power level of a CPICH of the non-serving base station, as received and measured at the user equipment, and a CPICH transmit power level of the non-serving base station; and
determining the second path gain as a ratio between a CPICH power level of a CPICH of the serving base station, as received and measured at the user equipment, and a CPICH transmit power level of the serving base station.

10. The method of claim 8:
wherein the determining the boosting factor comprises determining the boosting factor only once and by:
determining the first path gain as an inverted value of a CPICH transmit power level of the non-serving base station; and
determining the second path gain as an inverted value of a CPICH transmit power level of the serving base station.

11. The method of claim 9, further comprising receiving, from the serving base station and from the non-serving base station, broadcast signals comprising the CPICH transmit power level of the serving base station and the CPICH transmit power level of the non-serving base station, respectively.

12. The method of claim 8, wherein determining the boosting factor comprises determining the ratio of path gains of the channel to the serving base station and of the channel to the non-serving base station, respectively, as a ratio of Block Error Rates to the serving base station and the non-serving base station, respectively.

13. The method of claim 8, wherein determining the boosting factor comprises:
receiving a nominal boosting factor from the serving base station;
scaling the nominal boosting factor with the boosting factor determined based on the ratio of base station power levels or a fraction thereof.

14. The method of claim 8, wherein the conditions for boosting the uplink control channel are fulfilled when each of the following are true:
an active set comprises a link to both a macro base station and a pico base station;
the macro base station is the serving base station;
the communication system is configured for extended Soft Handover.

15. A user equipment for enhancing reception quality of transmissions on an uplink control channel from the user equipment to a serving base station, wherein the user equipment, the serving base station, and a non-serving base station are comprised in a communication system; and wherein the user equipment comprises:
a determining circuit configured to, when conditions for boosting the uplink control channel are fulfilled, determine a boosting factor based on a ratio of path gains of a channel from the user equipment to the serving base station and of a channel from the user equipment to the non-serving base station, respectively, wherein the ratio of path gains comprises a first path gain and a second path gain, the first path gain is a path gain of the channel from the user equipment to the non-serving base station and the second path gain is a path gain of the channel from the user equipment to the serving base station; and a boosting circuit configured to boost a transmit power level of the uplink control channel based on the determined boosting factor, whereby the reception quality of transmissions on the uplink control channel from the user equipment to the serving base station is enhanced.

\* \* \* \* \*